J. G. NELSON.
ANTIFRICTION BEARING.
APPLICATION FILED JULY 26, 1919.
1,394,110.
Patented Oct. 18, 1921.
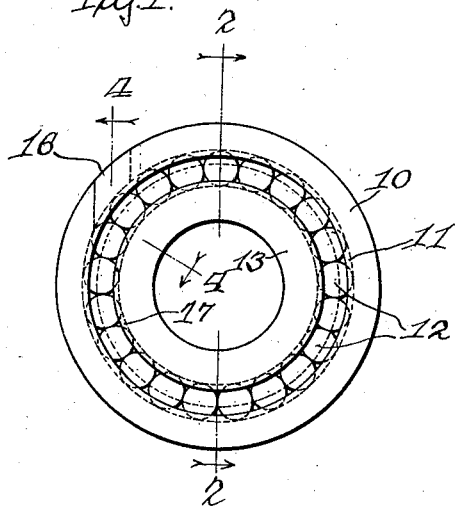
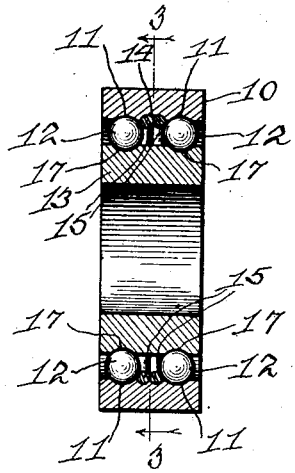
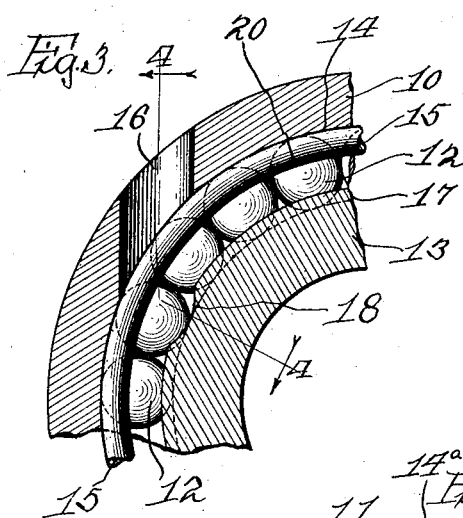
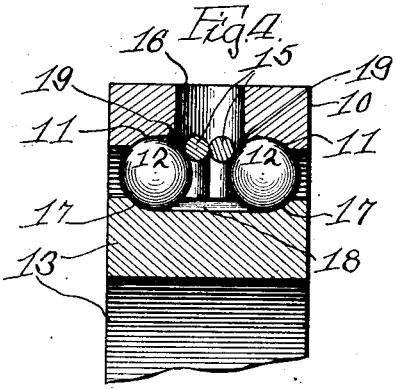
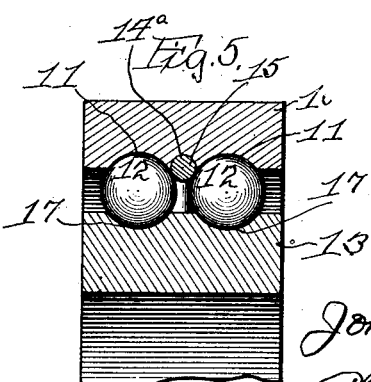

UNITED STATES PATENT OFFICE.

JOHN G. NELSON, OF ROCKFORD, ILLINOIS.

ANTIFRICTION-BEARING.

1,394,110.  Specification of Letters Patent.  Patented Oct. 18, 1921.

Application filed July 26, 1919. Serial No. 313,591.

*To all whom it may concern:*

Be it known that I, JOHN G. NELSON, a citizen of the United States, residing at Rockford, in the county of Winnebago and State of Illinois, have invented certain new and useful Improvements in Antifriction-Bearings, of which the following is a specification.

The invention relates to anti-friction bearings of that type thereof wherein the retaining rings or casing members are provided with a plurality of continuous and uninterrupted race-ways or tracks and a corresponding plurality of series of balls located therein, and it consists in certain peculiarities of the construction, novel arrangement and operation of the various parts thereof as will be hereinafter more fully set forth and specifically claimed.

The principal object of the invention is to provide an anti-friction bearing of the ball type, which shall be of such construction and operation of its parts as to furnish a heavy duty bearing with a greatly augmented bearing surface, thereby insuring longer life or durability and more satisfactory service, and which shall be extremely simple and inexpensive in construction, strong and durable, and so made that the parts thereof can be readily assembled for use, or disassembled for repairs or replacement of parts should they become defective or impaired.

Another important object of the invention is to so construct, combine and arrange the various parts of the bearing, as to reduce to a minimum the friction incident to the operation of the parts, to the end, that great ease of operation, as well as high rotary speed may be afforded to the element or parts of the machine or machinery for which the bearing is used.

Still another object of the invention, is to provide means to take care of or sustain great thrust loads and to reduce to a minimum the noise incident to the operation of the various parts of the bearing.

Other objects and advantages of the invention will be disclosed in the subjoined description and explanation.

In the accompanying drawing which serves to illustrate the invention,

Figure 1 is a face view of an antifriction bearing device embodying one form of the invention, showing the parts thereof in position for use.

Fig. 2 is a sectional view taken on line 2—2 of Fig. 1, looking in the direction indicated by the arrows.

Fig. 3 is an enlarged fragmental sectional view taken on line 3—3 of Fig. 2 looking in the direction indicated by the arrows.

Fig. 4 is a fragmental sectional view taken on the lines 4—4 of Figs. 1 and 3 of the drawing, looking in the direction indicated by the arrows, and Fig. 5 is a sectional view through a portion of the retaining rings or casing members, showing a modification in the construction of the bearing.

Like numerals of reference, refer to corresponding parts throughout the different views of the drawing.

Referring now more particularly to Figs. 1 to 4 inclusive of the drawing, the reference numeral 10 designates the outer retaining member or ring of the bearing, which may be made of any suitable size and material. As shown, this member is preferably made in the form of a ring, but if desired, it may have its outer portion of other shape than circular. The member or ring 10 has on its inner periphery a plurality (in the present instance two) of circumferentially disposed and spaced apart race-ways or tracks 11 for a plurality of series of balls 12, which are retained in said ways or tracks by means of the inner retaining ring or casing member 13, which is concentrically located within the outer ring 10 at a sufficient distance from the latter to receive the series of balls 12 between the adjacent surfaces of the retaining rings or members.

The inner periphery of the outer ring 10 is provided between the race-ways 11 thereof, with a circumferentially disposed groove or recess 14 for the reception and retention of a pair of rings 15, which are located side by side in the groove or channel 14, and are employed to assist in holding the series of balls 12 in their respective race-ways or tracks in the inner and outer retaining members 10 and 13 respectively, as well as for preventing the accidental displacement of the balls through the inlet or insertion opening 16 therefor, as will be presently more fully explained.

By reference to the drawing, it will be seen and understood that the retaining members 10 and 13 are of substantially the same thickness and that the inner retaining ring 13 is provided on its outer surfaces with a plurality (in the present instance two) of circumferentially disposed race-ways or tracks 17 which, like the ways or tracks 11, are concave in cross-section.

The tracks 17 of the inner retaining member or ring 13 are so located as to register with the tracks 11, thus holding the balls in continuous and uninterrupted pathways which offer no impediment or obstruction to the travel of the balls thereon.

As will be observed in Figs. 3 and 4 of the drawing, the adjacent portions of each of the race-ways 17 in the inner retaining member 13 is cut away as at 18 to permit the balls 12 as they are inserted through the opening 16 in the outer member 10, which opening is slightly larger than the diameter of the balls 12, to pass sidewise into said raceways.

To further facilitate the passage of the balls as they are inserted through the opening 16, the opposite sides of the inner portion of the opening is cut away as at 19, see Fig. 4 of the drawing, which cut-away portions of the opening should substantially register with the cut-away portions 18 of the inner retaining member 13 when the balls are being assembled in their respective race-ways.

After each race-way in the inner and outer retaining members are supplied with their full complement of balls, the ball retaining member which may consist of two broken or split rings 15, of resilient or expansible wire, as shown in Figs. 1 to 4 inclusive, or of a single wire as shown in the modified form illustrated in Fig. 5 of the drawing, may have one of its ends inserted through the tangentially disposed opening 16 and extended between the rows of balls around the inner periphery of the outer member 10 until the entire ball retaining member 15 is encompassed by said member, in which position or condition the ball retaining member may be moved in the proper direction, so that its joint 20, or its ends may be located at one side of the opening 16, which arrangement will prevent any possibility of the balls 12 being accidentally dislocated, yet which arrangement will permit the retaining member 15 to be moved so that the meeting ends thereof or joint 20 may be brought into coincidence with the opening 16 when one of said ends of the member 15 can be sprung outwardly through said opening so as to permit of the withdrawal of the ball retaining member, after which it is obvious that the balls may be readily removed through the opening 16 if desired.

In the modified construction shown in Fig. 5 of the drawing, it will be understood that the construction thereof is substantially the same as in the construction just above described and illustrated in Figs. 1 to 4 of the drawing, except that the outer retaining member 10 has a groove or channel 14ª, of sufficient size to accommodate a single wire or ring 15 instead of a plurality of such rings as in the other construction. The operation of the parts in the modified form are the same as above described.

Having thus fully described my invention, what I claim as new and desire to secure by Letters Patent is:—

1. An anti-friction bearing of the ball type, consisting of an outer and inner retaining member concentrically spaced apart and having coinciding race-ways in their adjacent surfaces, the outer retaining member having a tangentially disposed opening extended therethrough and located between its race-ways, a series of balls located within said race-ways of the retaining members and a broken resilient member located against the inner periphery of said outer member between the race-ways thereof after said balls have been inserted in place.

2. An anti-friction bearing of the ball type, consisting of an outer and an inner retaining member concentrically spaced apart and having coinciding race-ways on their adjacent surfaces, the outer retaining member having a tangentially disposed opening extended therethrough and located between its race-ways, the opposite sides of the outer retaining member being cut away at the inner end of said opening and the inner portions of the adjacent walls or portions of the race-ways in the inner retaining member being cut away at points near the inner end of said opening, a series of balls located within said race-ways of the retaining members and a broken resilient member located against the inner periphery of said outer member between the race-ways thereof and extended across the opening therein, said resilient member being inserted after said balls have been placed in position and being removable from between the retaining members through the said opening in the outer of said members.

3. An anti-friction bearing of the ball type, consisting of an outer and an inner retaining member concentrically spaced apart and having coinciding race-ways on their adjacent surfaces, the outer retaining member having a circumferentially disposed groove in its inner periphery between the race-ways of said member and provided with a tangentially disposed opening extended therethrough and located between its race-ways and intersecting said groove, a series of balls located within said race-ways of the retaining members and a broken resilient member located against the inner periphery of said outer member within the groove thereof after the balls have been inserted in place and removable therefrom through said opening.

4. An anti-friction bearing of the ball type, consisting of an outer and an inner retaining member concentrically spaced apart and having coinciding race-ways on their adjacent surfaces, the outer retaining member having a circumferentially disposed groove in its inner periphery between the race-ways of said member and provided with a tangentially disposed opening extended therethrough and located between its race-ways and intersecting said groove, a broken resilient member consisting of at least one broken ring or cylindrical cross-section located against the inner periphery of said outer member within the groove thereof and extended across the opening therein and removable from said groove through said opening, the opposite sides of the outer retaining member being cut away at the inner end of said opening and the inner portions or the adjacent walls of the race-ways in the inner retaining member being cut away at points near the inner end of said opening, and a series of balls located within said race-ways of the retaining members, the said resilient member being inserted after said balls have been placed in position.

In testimony whereof I hereunto set my hand, on this, the 23rd day of July, A. D., 1919.

JOHN G. NELSON.